(12) United States Patent
Goto et al.

(10) Patent No.: US 6,371,650 B1
(45) Date of Patent: Apr. 16, 2002

(54) HYDRAULIC DYNAMIC BEARING AND SPINDLE MOTOR AND ROTARY ASSEMBLY PROVIDED

(75) Inventors: Hiromitsu Goto; Isamu Takehara; Yukihiro Nakayama; Ryouji Yoneyama; Takafumi Suzuki; Toshiharu Kogure; Tadao Iwaki; Naoki Kawawada; Atsushi Ota; Koji Nitadori, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/414,244

(22) Filed: Oct. 7, 1999

(30) Foreign Application Priority Data

| Oct. 8, 1998 | (JP) | 10-286881 |
|---|---|---|
| Oct. 8, 1998 | (JP) | 10-286894 |
| Oct. 15, 1998 | (JP) | 10-294272 |
| Oct. 15, 1998 | (JP) | 10-294273 |
| Oct. 1, 1999 | (JP) | 10-280978 |

(51) Int. Cl.$^7$ ............................................. F16C 32/06
(52) U.S. Cl. .................... 384/110; 384/113; 384/115; 384/118
(58) Field of Search ....................... 384/107, 110, 384/113, 115, 118

(56) References Cited

U.S. PATENT DOCUMENTS

| 3,399,001 | A | * | 8/1968 | Whitaker | 384/110 X |
|---|---|---|---|---|---|
| 5,096,309 | A | * | 3/1992 | Nakasugi et al. | 384/113 X |
| 5,533,811 | A | * | 7/1996 | Polch et al. | 384/107 |
| 5,536,088 | A | * | 7/1996 | Cheever et al. | 384/107 |
| 5,791,784 | A | * | 8/1998 | Ichiyama | 384/107 |
| 5,847,479 | A | * | 12/1998 | Wang et al. | 384/107 X |
| 6,019,516 | A | * | 2/2000 | Leuthold et al. | 384/110 |
| 6,118,620 | A | * | 9/2000 | Grantz et al. | 384/107 X |
| 6,144,523 | A | * | 11/2000 | Murthy et al. | 384/110 X |
| 6,154,339 | A | * | 11/2000 | Grantz et al. | 384/110 X |

* cited by examiner

Primary Examiner—Charles A Marmor
Assistant Examiner—Ha Ho
(74) Attorney, Agent, or Firm—Adams & Wilks

(57) ABSTRACT

A double sleeve type dynamic bearing comprises a fixed shaft having at least one end fixedly mountable to an apparatus in which the bearing is utilized, a rotary sleeve arranged coaxially with the fixed shaft so that a first fine gap is formed therebetween, a fixed sleeve arranged coaxially with the rotary sleeve so that a second fine gap is formed therebetween, and a lubrication oil filled in the fine gaps. The first fine gap and the second fine gap each have an open end exposed to air outside the bearing and an opposite end that is not exposed to the air, the opposite ends being in communication with each other. A holding member holds the fixed shaft and the fixed sleeve and is disposed adjacent to a lower end surface of the rotary sleeve to form a third fine gap between the holding member and the lower end surface of the rotary sleeve. The third fine gap is formed with a thrust dynamic pressure producing groove, and opposite ends of the first and second fine gaps meet each other through the third fine gap. A peripheral surface of at least one of the fixed shaft, the rotary sleeve and the fixed sleeve forming at least one of the first and second fine gaps has a dynamic pressure producing groove formed therein.

46 Claims, 14 Drawing Sheets

HYDRAULIC DYNAMIC BEARING AND SPINDLE MOTOR AND ROTARY ASSEMBLY PROVIDED

BACKGROUND OF THE INVENTION

This invention relates to a fluid dynamic pressure bearing adapted as a bearing for rotary apparatuses such as hard disc drive (HDD) units, a spindle motor used as a drive source for such rotary apparatuses and a fluid dynamic pressure bearing adapted for such spindle motors, and more particularly to a both-end fixed-shaft type fluid dynamic pressure bearing having a shaft to be fixed at its respective ends on a chassis, etc. of an apparatus utilized through screwing or the like.

Air dynamic pressure bearings are broadly used in rotary apparatuses such as an HDD, drive optical disc and light polarizing units because of their excellent merits such as their light weight, clean and smooth rotation, durability to heat and cold, long service life and noncontamination to a recording media such as a disc by virtue of not using lubrication oil. In recent years, however, there has been a significant increase in information to be processed. Particularly, are large capacity HDD apparatuses required to rotationally drive as many as five or more disc. This requirement can no longer be met by an air dynamic pressure bearing. In order to cope with this, fluid dynamic pressure bearings have been adopted in HDD apparatuses to support greater load weight than that supported by the air dynamic pressure bearings.

There are disclosures of the basic structure and operation of fluid dynamic pressure bearing, for example, in U.S. Pat. No. 5,112,142; U.S. Pat. No. 5,524,985; U.S. Pat. No. 5,524,986; and U.S. Pat. No. 5,533,812.

The conventional fluid dynamic pressure bearings, particularly fluid dynamic pressure bearings of the sleeve rotation, type include two kinds of devices depending on the ways used to fix the shaft onto an apparatus in which it is utilized. One type is a one-end fixed-shaft type fluid dynamic pressure bearing as shown in FIG. 13, and the other is a both-end fixed-shaft type fluid dynamic pressure bearing as shown in FIG. 14. First, the fluid dynamic pressure bearing of FIG. 13 is structured by a fixed shaft 1 at its lower end fixed on a chassis 16 or the like through a screw 15, and a rotary sleeve 2 having an upper end completely covered by a lid member 20 and a lower end having an opening 11 forming a capillary seal. Next, the fluid dynamic pressure bearing of FIG. 14 is structured by a fixed shaft 1 fixed at its opposite ends on a chassis 16 or the like of an apparatus utilized through screws 14 and 15, and a rotary sleeve 2 having openings 11a and 11b respectively forming upper and lower capillary seals.

In FIG. 13 and FIG. 14, 8, 8a, and 8b are radial dynamic pressure producing grooves while 9a and 9b are thrust dynamic pressure producing grooves. 5, 5a, 5b, 17a, 17b and 17c are fine gaps formed between the fixed shaft 1 and the rotary sleeve 2. These fine gaps are filled therein with lubrication oil 18. The fine gaps have a width of usually 2 to 15 μm, although depending on the size of the fluid dynamic pressure bearing. 13a is an upper screw hole of the fixed shaft, while 13, 13b is a lower screw hole.

In the shaft-one-end fixed type fluid dynamic pressure bearing of FIG. 13, the lubrication oil 18 filled within the fine gaps 5, 17a, 17b and 17c contacts with the air at tapered opening 11. However, the lubrication oil 18 filled in the gaps is prevented from leaking outside the fine gaps by a capillary seal and surface tension due to the opening 11. In particular, the fine gaps 17a, 17b and 17c form a closed end.

The filled lubrication oil 18 hardly leaks out through the opening 11 due to a fine gap structure having such a closed end, i.e. a fine gap structure with one-side closure. In the both-end fixed-shaft type fluid dynamic pressure bearing of FIG. 19, on the other hand, the lubrication oil 18 filled within the fine gaps 5a, 5b, 17a, 17b and 17c contacts with the air at a tapered upper opening 11a and lower opening 11b. However, the filled lubrication oil 18 is prevented from leaking out of the fine gaps by the capillary seal and surface tension due to the openings.

Of the above related-art apparatus, the one-end fixed-shaft type fluid dynamic pressure bearing of FIG. 13 has a closed end in the fine gaps. Accordingly, the apparatus, in case tilted, hardly causes the lubrication oil to leak thus being excellent in sealability. However, there is a disadvantage in that the shaft 1 is fixed at only one point of its lower end and undergoes precession motion during rotation at high speed, resulting in instability in rotation. Conversely, the both-end fixed-shaft type dynamic pressure bearing of FIG. 14 fixes the shaft 1 at its both ends and hence does not undergo precession motion, offering stable rotation. However, there is a problem in that the fine gaps are opened to the air at upper and lower sides thus resulting in insufficient sealability. Even if a surface tension is formed by forming an air reservoir in a fine gap between the upper and lower radial dynamic pressure producing grooves 8a and 8b, the surface tension abruptly decreases when the fluid dynamic pressure bearing is tilted and positioned in a horizontal direction. Furthermore, when, in this state, temperature change or external impact is applied, the lubrication oil filled within the fine gap readily leaks to the outside.

SUMMARY OF THE INVENTION

It is an object of the present invention to maintain, in a both-end fixed-shaft type fluid dynamic bearing, a high sealability not only during rotation at high speed but also even upon being tilted in a standstill state.

It is another object of the invention to provide a spindle motor which can stably rotate at high speed.

It is still another object of the invention to provide a rotary apparatus which can stably rotationally drive at high speed a rotary member such as a hard disc.

In brief, the present invention is a double sleeve type fluid dynamic pressure bearing, comprising: a fixed shaft having respective ends to be fixed to an apparatus utilized; a rotary sleeve arranged to provide a first fine gap between an inner peripheral surface thereof and an outer peripheral surface of the fixed shaft; a fixed sleeve arranged to provide a second fine gap between an inner peripheral surface thereof and an outer peripheral surface of the rotary sleeve; and wherein the first fine gap and the second fine gap have one ends made as open ends contacting the air while the first fine gap and the second fine gap have the other ends made as closed ends in direct communication with each other, the fine gaps being filled with lubrication oil, and the first fine gap being formed with a dynamic pressure producing groove.

In the double sleeve type dynamic pressure bearing, the second fine gap is greater in width than the first fine gap within a range of capable of producing a dynamic pressure, thereby removing instability during high speed rotation due to a difference in flowing speed of lubrication oil.

In the double sleeve type fluid dynamic pressure bearing, seal means different from a related art capillary seal is provided at the opening of the second fine gap. The seal means is a resinous collar fitted at an outer end of the fixed sleeve. Alternatively, the seal means may be a curved type annular seal groove formed in the opening of the second fine gap by a first curved wall surface curved radially outward and a second curved wall surface similarly curved radially outward. Furthermore, the seal means may be a multi-staged slant type annular seal groove formed in the opening of the second fine gap by a first plurality slant wall surface having a plurality of annular slant surfaces slanted by stages radially outward and a second plurality slant wall surface having a plurality of annular slant surfaces similarly slanted by stages radially outward.

Also, the present invention is, in a spindle motor structured by a rotor including a rotor magnet, a stator including a stator coil and a fluid dynamic pressure bearing for rotatably supporting the rotor with respect to the stator, the spindle motor adopting for the fluid dynamic pressure bearing a double sleeve type fluid dynamic pressure bearing. The invention is furthermore a rotary apparatus having, as drive source to a rotary member, the spindle motor structured by a rotor including a rotor magnet, a stator including a stator coil and a fluid dynamic pressure bearing for rotatably supporting the rotor with respect to the stator.

BEST MODE FOR PRACTICING THE INVENTION

Figure 1:
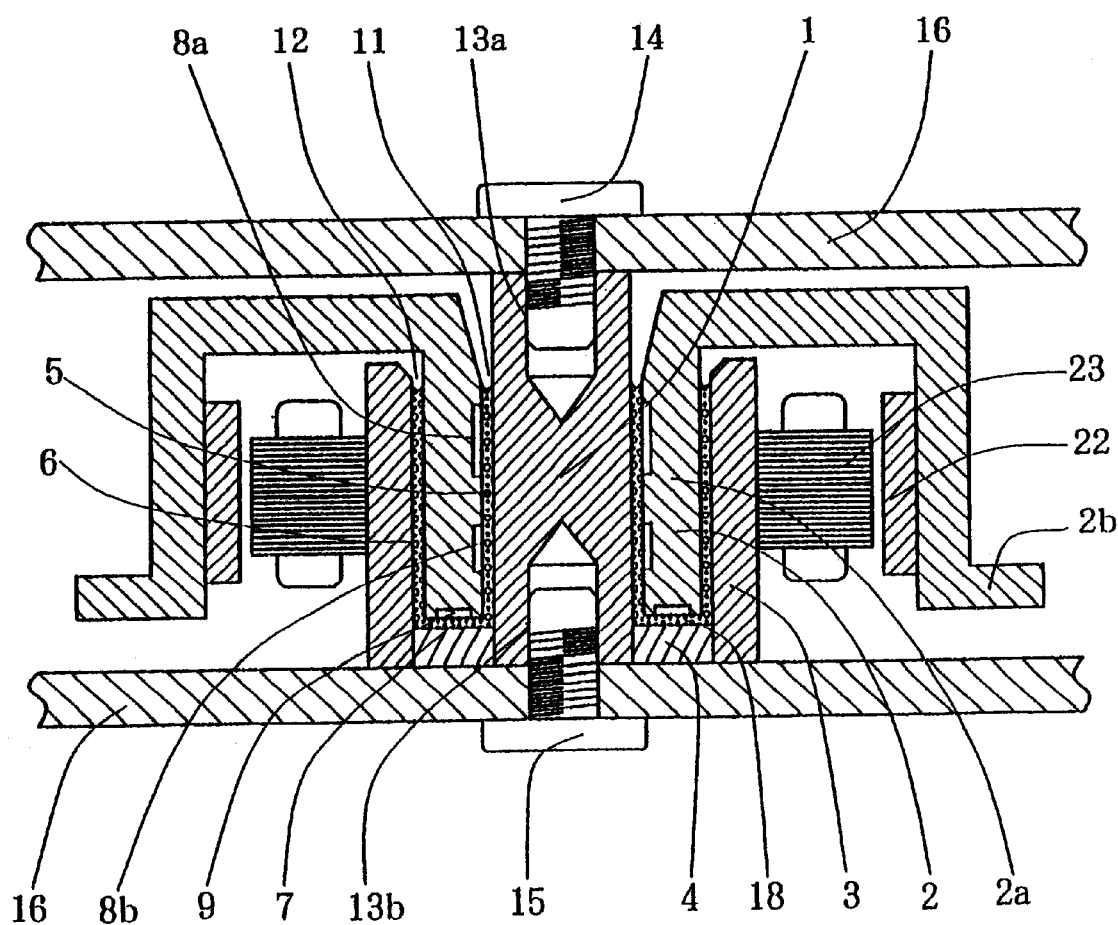
FIG. 1 is a sectional view of a spindle motor having a first embodiment of a fluid dynamic pressure bearing according to the present invention.

Referring to FIG. 1, there is shown a sectional view of a double sleeve structure both-end fixed-shaft type dynamic pressure bearing according a first embodiment of the present invention, and a spindle motor having this fluid dynamic pressure bearing. In FIG. 1, the fluid dynamic pressure bearing includes a fixed shaft 1 fixed at respective ends to an apparatus utilized, a rotary sleeve 2 providing a first fine gap 5 cooperatively with the fixed shaft 1, a fixed sleeve 3 providing a second fine gap 6 cooperatively with the rotary sleeve 2, and a holder member 4 providing a third fine gap 7 cooperatively with the rotary sleeve 2.

The fixed shaft 1 is formed with screw holes 13a and 13b at respective ends. The fixed shaft 1 is firmly fixed to a chassis 16 of an apparatus utilized such as an HDD apparatus through screws 14 and 15 screwed to the screw holes 13a and 13b. The rotary sleeve 2 is a member formed by a sleeve portion 2a having inner and outer peripheral surfaces, a cup-like hub 2b for holding a rotary member such as a disc, and a disc formed extended portion 2c for firmly fixing the cup-like hub 2b at an upper end of the sleeve 2a. The disc-formed extended portion 2c is a portion in a disc form that is horizontally radially outwardly extended from an upper end of a sleeve portion 2a of the rotary sleeve 2, and formed integral with the sleeve 2a. The cup-like hub 2b serves also as a rotor member for the spindle motor having a rotor magnet 22 mounted on an inner peripheral surface thereof. The fixed sleeve 3 is a member arranged standing on the base plate of the bearing or spindle motor. In the apparatus of the FIG. 1 embodiment without using a base plate, the fixed sleeve 3 is provided standing adjacent the holder member 4 with its inner peripheral surface fitted liquid-tight to an outer peripheral surface of the disc-like holder member 4 coaxially fixed to the fixed shaft 1. The fixed sleeve 3 also serves as a stator member for the spindle motor, and has a stator coil 23 mounted on an outer peripheral surface thereof.

A tapered opening 11 is provided at a top end of a first fine gap 5 formed between an outer peripheral surface of the fixed shaft 1 and an inner peripheral surface of the rotary sleeve 2. Similarly, a tapered opening 12 is also provided at a top end of a second fine gap 6 given between an outer peripheral surface of the rotary sleeve 2 and an inner peripheral surface of the fixed sleeve 3. A third fine gap 7 is given between an lower end surface of the rotary sleeve 2 and an upper surface of the disc-like holder member 4, which has one end communicated with a lower end of the first fine gap 5 and the other end communicated with a lower end of the second fine gap 6. In brief, the third fine gap 7 serves as a closed end with respect to the openings 11 and 12. Lubrication oil 18 is filled within the first fine gap 5, second fine gap 6 and third fine gap 7.

Each of these fine gaps, although exaggeratedly shown in FIG. 1, is actually a fine gap of a size of approximately 5 to 200 $\mu$m. Due to this, the lubrication oil 18 has its liquid levels respectively kept at bottom portions of the tapered openings 11 and 12 by a surface tension and capillary phenomenon, being prevented from leaking to the outside in a usual use state. Moreover, the first fine gap 5 and the second fine gap 6 at their lower ends are communicated through the third fine gap 7, forming a closed end. Accordingly, even in case the fluid dynamic pressure bearing of the invention is tilted, the lubrication oil 18 filled within these fine gaps hardly leaks to the outside.

Radial dynamic pressure producing grooves 8a and 8b are provided vertically separated in an inner peripheral surface of the sleeve portion 2a of the rotary sleeve 2 forming the first fine gap 5. A thrust dynamic pressure producing groove 9 is provided in a lower end surface of the sleeve portion 2a of the rotary sleeve 2 forming the third fine gap 7. The radial dynamic pressure producing grooves 8a and 8b are herringbone grooves but may be of other forms. The thrust dynamic pressure producing groove 9 are herringbone grooves in an annular arrangement but may be of other forms.

The spindle motor thus constructed, when supplied by an energizing current to its stator coil 23, is rotated due to electromagnetic action caused by the current and magnetic field of the rotor magnet 22. Thereupon, a radial dynamic pressure is caused in the first fine gap 5 through the radial dynamic pressure producing grooves 8a and 8b, and a thrust dynamic pressure is caused in the third fine gap 7 through the thrust dynamic pressure producing groove 9. Thus, the spindle motor smoothly maintains rotation at high speed while supporting a rotary member, such as a hard disc, by these dynamic pressures.

The double sleeve structure both-end fixed-shaft type fluid dynamic pressure bearing of the invention explained above was structured by adopting a circular columnar member for the shaft 1, a cylindrical member for the rotary sleeve 2, and a cylindrical member for the fixed sleeve 3. Now, among various modifications, four embodiments will be described with reference to FIG. 2 to FIG. 5 exaggeratedly showing the fine gaps.

Figure 2:
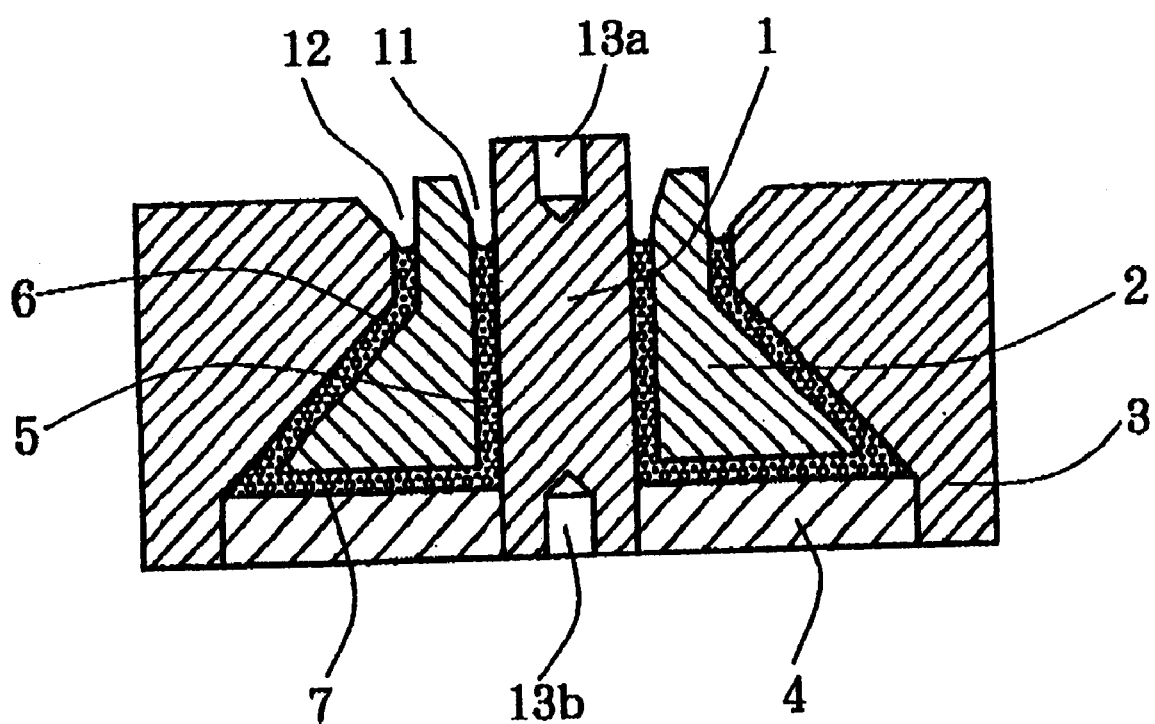
FIG. 2 is a sectional view of a first modification of a fluid dynamic pressure bearing of the invention.

Referring to FIG. 2, a double sleeve structure bothend fixed-shaft type fluid dynamic pressure bearing is shown as a modification for the fluid dynamic pressure bearing of FIG. 1. That is, the double sleeve structure both-end fixed-shaft type fluid dynamic pressure bearing of FIG. 2 is structured by adopting a circular columnar member for a fixed shaft 1, a conical frustum member for a rotary sleeve 2, and a conical-inner-perpheral-surfaced member for a fixed sleeve 3 to cooperate with an conical outer peripheral surface to provide therebetween a second fine gap 6. A first fine gap 5 is given between an outer peripheral surface of the fixed shaft 1 and an inner peripheral surface of the rotary sleeve 2. A third fine gap 7 is given between a bottom surface of the rotary sleeve 2 and a top surface of the holder member 4, to communicate between respective lower ends of the first fine gap 5 and the second fine gap 6 serving as a closed end. The first fine gap 5 and the second fine gap 6 respectively have, at their upper ends, tapered openings 11 and 12 serving as capillary seals for the lubrication oil filled within the fine gaps.

Figure 3:
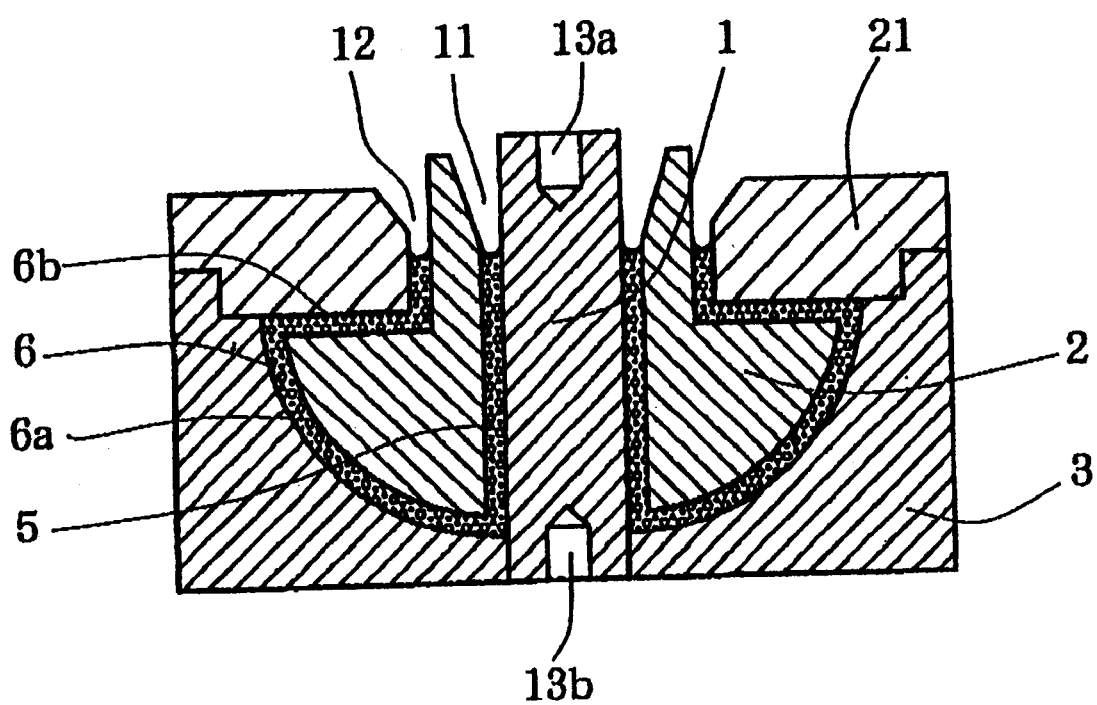
FIG. 3 is a sectional view of a second modification of a fluid dynamic pressure bearing of the invention.

Referring to FIG. 3, a double sleeve structure both-end fixed-shaft type dynamic pressure bearing is shown as a second modification for the fluid dynamic pressure bearing of FIG. 1. That is, the double sleeve structure both-end fixed-shaft type fluid dynamic pressure bearing of FIG. 3 is structured by adopting a circular columnar member for a fixed shaft 1, a member with a semi-spherical portion for a rotary sleeve 2, and a member with an inner peripheral surface providing a second fine gap 6 cooperatively with the semispherical surface of the rotary sleeve 2 for a fixed sleeve 3. The second gap 6 includes a semi-circular gap portion 6a and a horizontal gap 6b. A first fine gap 5 is given between an outer peripheral surface of the fixed shaft 1 and an inner peripheral surface of the rotary sleeve 2. The first fine gap 5 and the second fine gap 6 at their lower ends are directly communicated with each other thereby forming a closed end. The first fine gap 5 and the second fine gap 6 respectively have, at their upper ends, tapered openings 11 and 12 serving as capillary seals for the lubrication oil filled within the fine gaps.

In the meanwhile, it will be understood from FIG. 1, FIG. 2 and FIG. 3 that a variety of double sleeve structure both-end fixed-shaft type fluid dynamic pressure bearing can be realized depending on a member shape of the rotary sleeve 2 even with the fixed shaft 1 using a circular columnar member. Also, it will be apparent that the rotary sleeve 2 is not limited to the cylindrical member of FIG. 1, the conical frustum member of FIG. 2 or the semi-spherical-portion-having member of FIG. 3 but may adopt various shapes of members including deformed versions of cylindrical, conical frustum and disc members.

Figure 4:
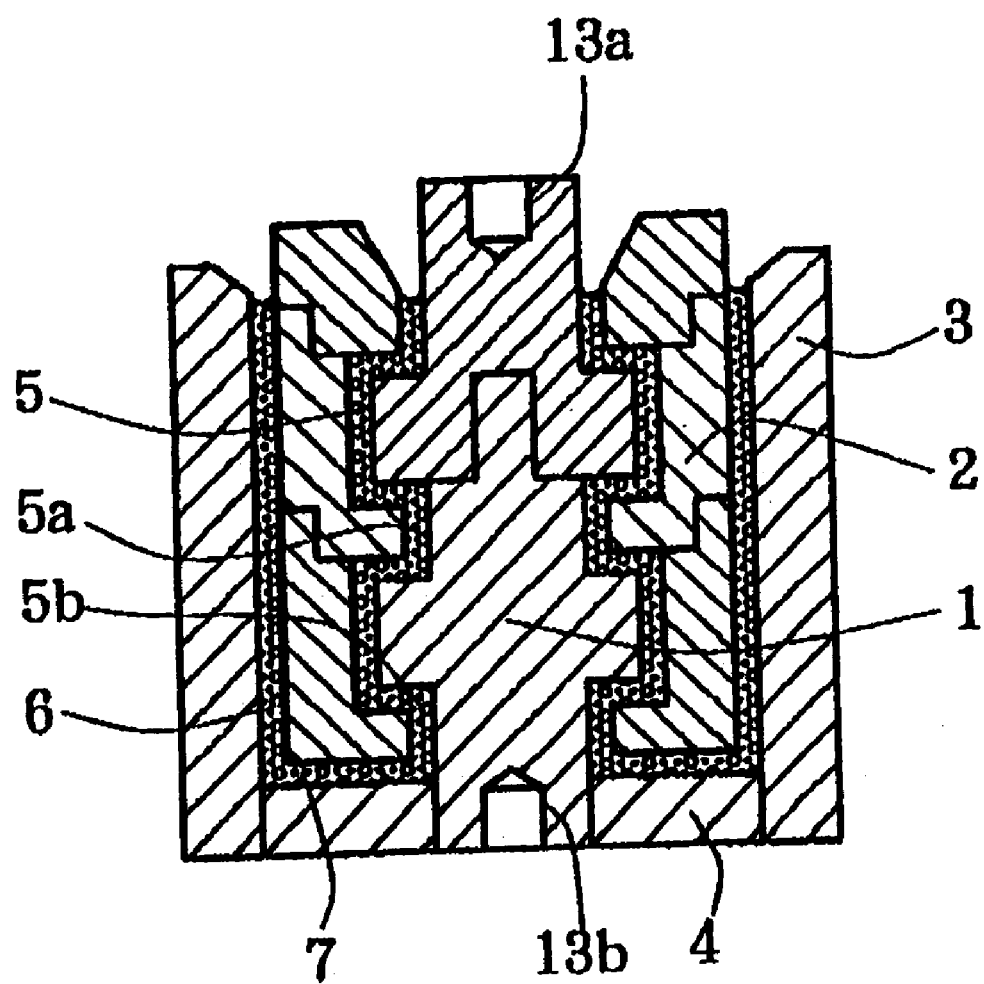
FIG. 4 is a sectional view of a third modification of a fluid dynamic pressure bearing of the invention.

Referring to FIG. 4, a double sleeve structure both-end fixed-shaft type dynamic pressure bearing is shown as a third modification for the fluid dynamic pressure bearing of FIG. 1. That is, the double sleeve structure both-end fixed-shaft type fluid dynamic pressure bearing of FIG. 4 is structured by adopting a circular columnar member having upper and lower large diameter portions for a fixed shaft 1, a member having an inner peripheral surface to provide a first fine gap 5 cooperatively with an outer peripheral surface of the fixed shaft 1 for a rotary sleeve 2, and a cylindrical member for a fixed sleeve 3. The first fine gap 5 includes a plurality of vertical gap portions 5a and a plurality of horizontal gap portions 5b. A second fine gap 6 is given between an outer peripheral surface of the rotary sleeve 2 and an inner peripheral surface of the fixed sleeve 3. The first fine gap 5 and the second fine gap 6 at their lower ends are communicated with each other to provide a third fine gap 7 serving as a closed end between a bottom surface of the rotary sleeve 2 and a top surface of the holder member 4. The first fine gap 5 and the second fine gap 6 respectively have, at their upper ends, tapered openings 11 and 12 serving as capillary seals for the lubrication oil filled within the fine gaps.

Figure 5:
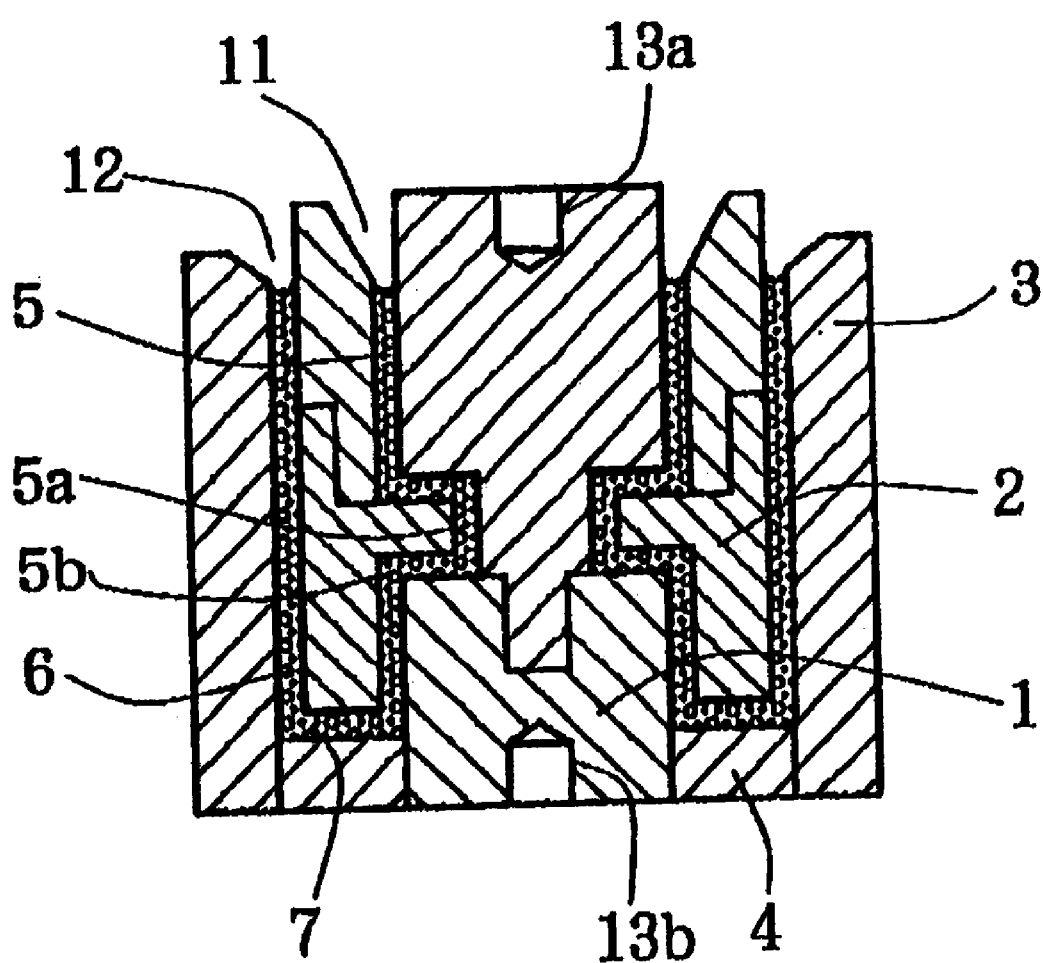
FIG. 5 is a sectional view of a fourth modification of a fluid dynamic pressure bearing of the invention.

Referring to FIG. 5, a double sleeve structure both-end fixed-shaft type dynamic pressure bearing is shown as a fourth modification for the fluid dynamic pressure bearing of FIG. 1. That is, the double sleeve structure both-end fixed-shaft type fluid dynamic pressure bearing of FIG. 5 is structured by adopting a circular columnar member having at its intermediate portion a small diameter portion for a fixed shaft 1, a member having an inner peripheral surface to provide a first fine gap 5 cooperatively with an outer peripheral surface of the fixed shaft 1 for a rotary sleeve 2, and a cylindrical member for a fixed sleeve 3. The first fine gap 5 includes a plurality of vertical gap portions 5a and a plurality of horizontal gap portions 5b. A second fine gap 6 is given between an outer peripheral surface of the rotary sleeve 2 and an inner peripheral surface of the fixed sleeve 3. The first fine gap 5 and the second fine gap 6 at their lower ends are communicated with each other to provide a third fine gap 7 serving as a closed end between a bottom surface of the rotary sleeve 2 and a top surface of a holder member 4. The first fine gap 5 and the second fine gap 6 respectively have, at their upper ends, tapered openings 11 and 12 serving as capillary seals for the lubrication oil filled within the fine gaps.

Figure 6:
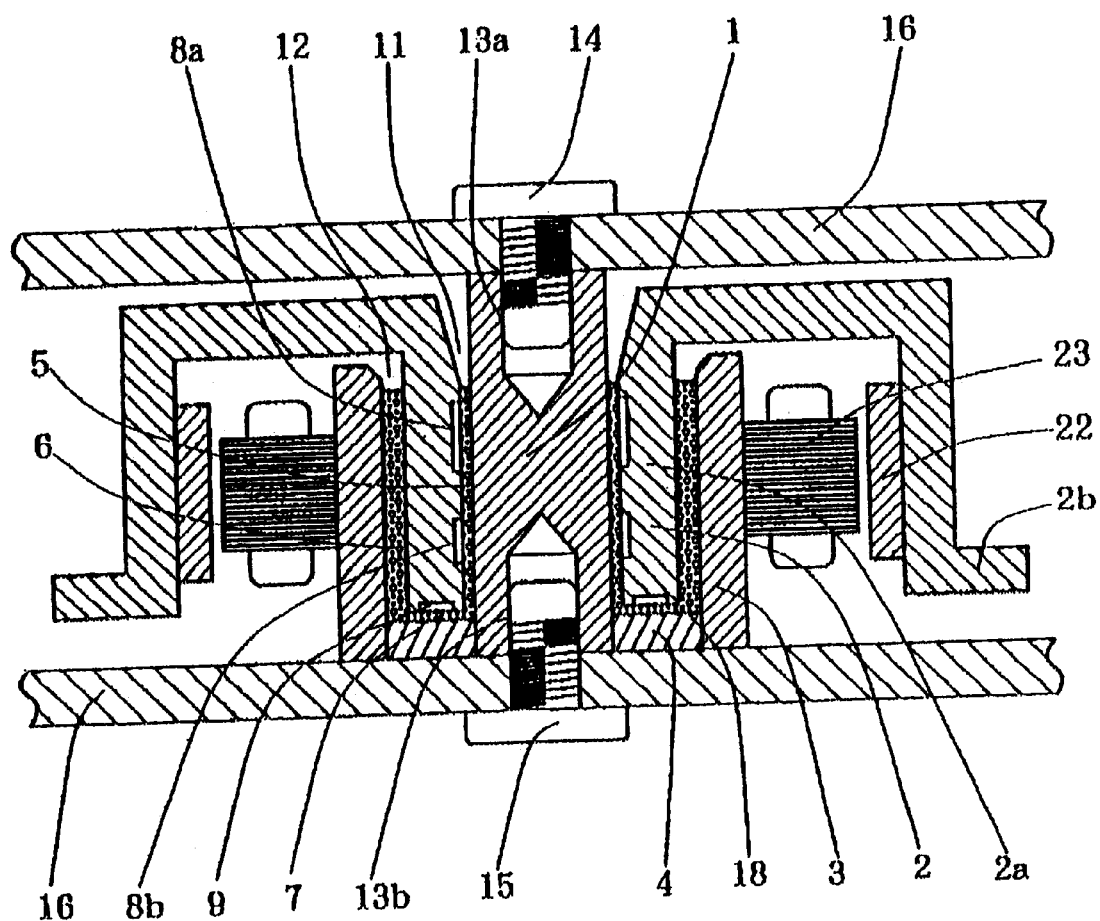
FIG. 6 is a sectional view of a spindle motor having a second embodiment of a fluid dynamic pressure bearing according to the present invention.

Referring to FIG. 6, there is shown a sectional view of a spindle motor having a second embodiment of a fluid dynamic pressure bearing of the present invention.

The fluid dynamic pressure bearing of FIG. 6 is the same in basic structure as the fluid dynamic pressure bearing of FIG. 1, but different in structure of the second fine gap 6. That is, the fluid dynamic pressure bearing of FIG. 6 has a second fine gap 6 that is wider in gap width than the second fine gap 6 of the fluid dynamic pressure bearing of FIG. 1.

Because the second fine gap 6 is located radially outward of the first fine gap 5, the speed of flowing lubrication oil is not equal between these fine gaps. The speed is greater in the second fine gap 6. It was found that the difference in speed impedes stability during high speed rotation in an actual apparatus and that a high flow speed of the lubrication oil 18 through the second gap 6 increases friction and hence loss.

Accordingly, the second fine gap 6 was made wider than the first fine gap 5 as shown in an exaggerated manner in FIG. 6. That is, the first fine gap 5 has a width of approximately 5 to 20 μm while the second fine gap 6 has a width of approximately 50 to 500 μm. This removed the instability at high speed rotation due to a difference in speed of lubrication oil. The width of the second fine gap is selected on an empirical basis as best suited depending on the structure and size of the fluid dynamic pressure bearing, lubrication oil property, and so on. Such a size includes a height of the first fine gap 5 and a height of the second fine gap 6. Incidentally, a width of the third fine gap 7 is selected as approximately same as the first fine gap 5.

Stable high speed rotation was thus realized in the spindle motor adopting the fluid dynamic pressure bearing that is stable at high speed rotation and low in loss. Accordingly, a large capacity HDD apparatus having this spindle motor as a drive source for a rotation member can rotate a hard disc at high speed smoothly and stably.

Figure 7:
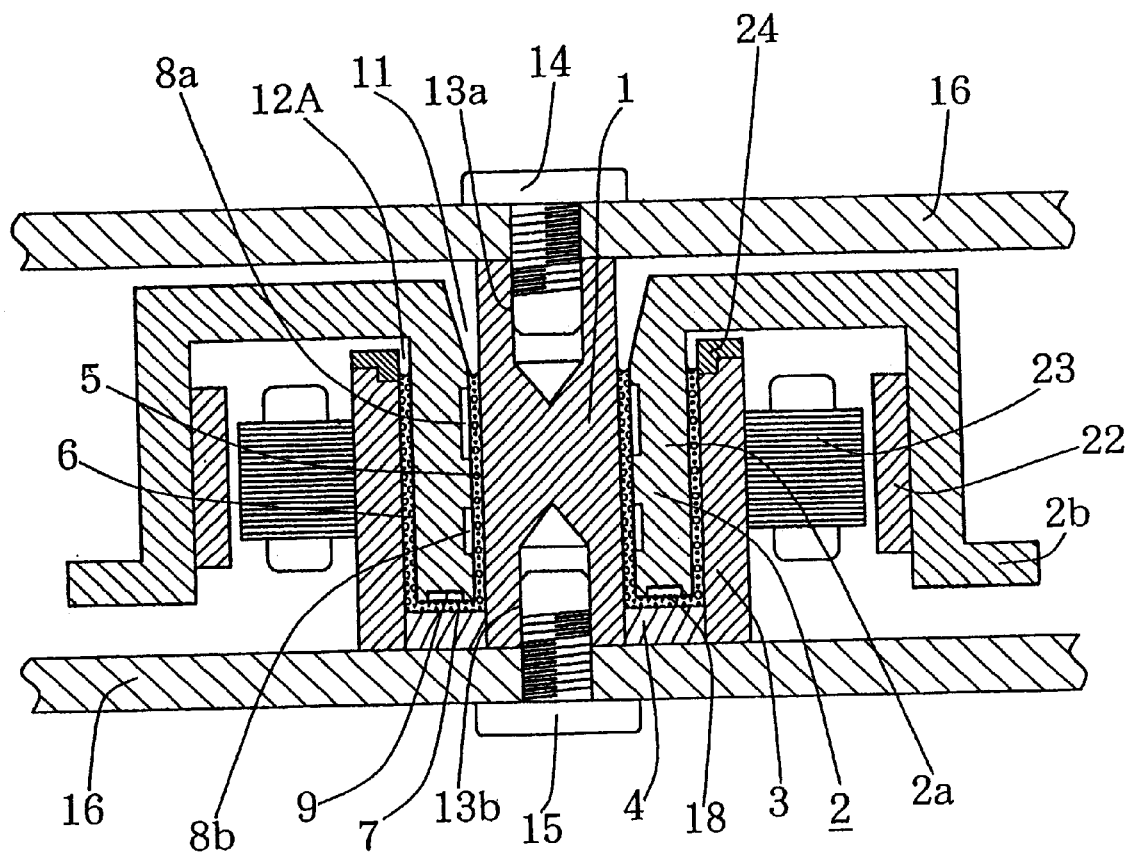
FIG. 7 is a sectional view of a spindle motor having a third embodiment of a fluid dynamic pressure bearing according to the present invention.

Referring to FIG. 7, there is shown a sectional view of a spindle motor having a third embodiment of a fluid dynamic pressure bearing of the present invention.

The fluid dynamic pressure bearing of FIG. 7 is the same in basic structure as the fluid dynamic pressure bearing of FIG. 1, but different in fluid seal structure at an opening of the second fine gap 6. That is, the fluid dynamic pressure bearing of FIG. 1 had, at the opening 12 of the second fine gap 6, the fluid seal structure made as a capillary seal structure utilizing a slant type annular seal groove having a groove width continuously increasing from its minimum groove portion toward maximum groove width portion, i.e. seal groove formed by the slanted inner peripheral surface of the fixed sleeve 3 extended outward in a continuous fashion and the vertical outer peripheral surface of the rotary sleeve 2. On the contrary, the fluid dynamic pressure bearing of FIG. 7 has, at an opening 12A of a second fine gap 6, a fluid seal structure made in a fluid seal structure utilizing a resin collar 24. This resin collar 24 is a ring-formed Teflon resin formed member that is nearly same in inner and outer diameters as the fixed sleeve 3.

Figure 8:
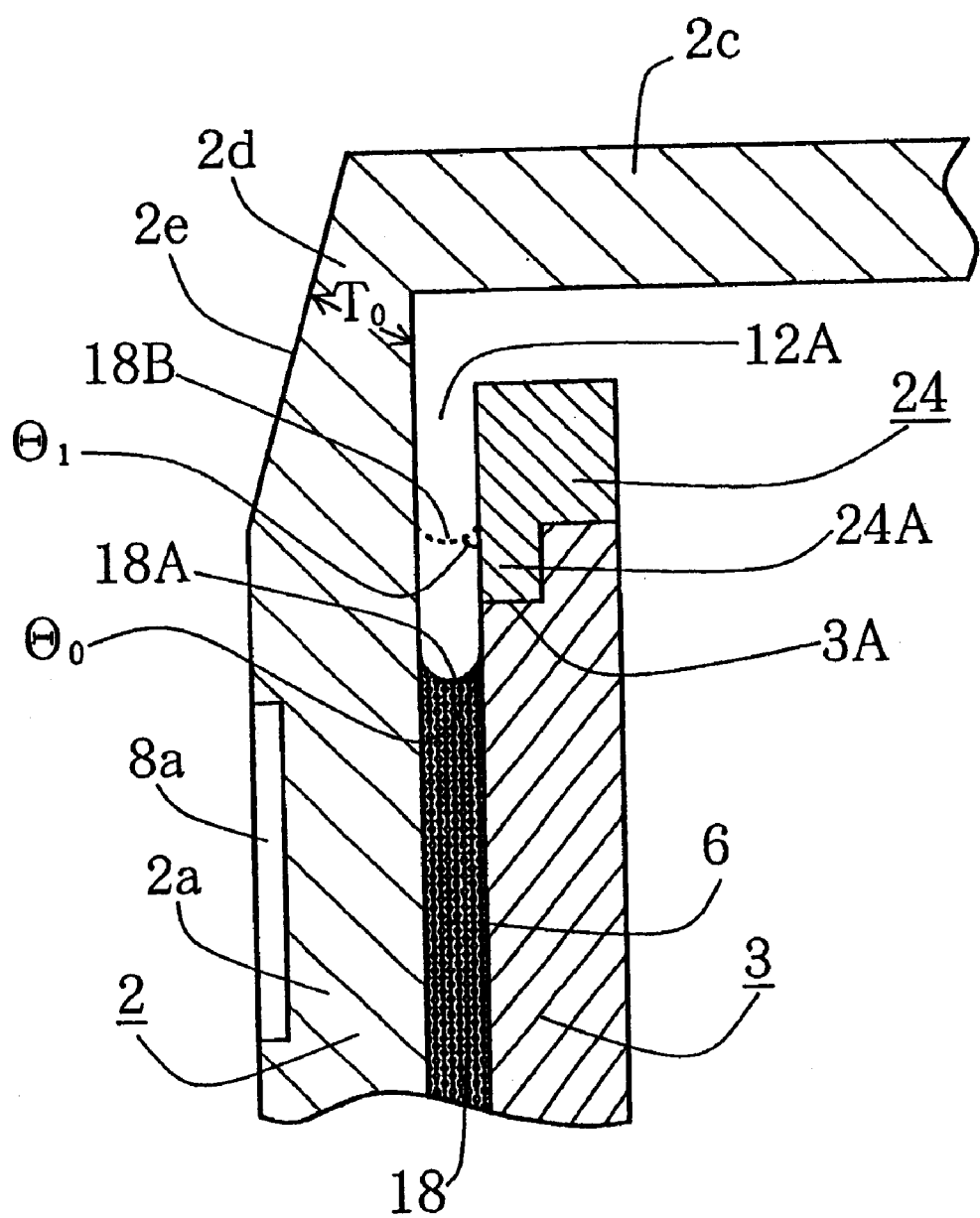
FIG. 8 is a partially magnified view including a resin-make collar.

The resin collar 24, as shown in the magnified view of FIG. 8, is formed at its axially lower side with a fitting annular leg 24A smaller in outer diameter than its upper side. on the other hand, the fixed sleeve 3 which provides the second fine gap 6 cooperatively with the rotary sleeve 2 is formed at its end with a fitting annular step 3A having an inner diameter equal to or slightly smaller than the outer diameter of the fitting annular leg 24A and a length equal to that of the fitting annular leg 24A. The resin collar 24 at its fitting annular leg 24A is press-fitted into the fitting annular step 3A of the fixing sleeve 3, thereby closely fitting and fixing the resin collar 24 in the end of the fixing groove 3.

The provision of the resin collar 24 improves wettability of lubrication oil 18 in an area close to the opening 12A of the second fine gap 6. Consequently, lubrication oil 18 reaches to a position close to the opening 12A of the second fine gap 6. The lubrication oil 18 contacting an inner peripheral surface of the resin collar 24 has an arcuate recess 18B in a surface smaller in recessing than an arcuate recess 18A in a surface of a lubrication oil 18 reaching close to the opening 12A of the second fine gap 6 but not contacting with the inner peripheral surface of the resin collar 24. In other words, an angle $\Theta_1$ defined between a tangent line of the recess 18B at a point where the lubrication oil 18 contacts the wall surface of the annular seal groove and the wall surface of the annular seal groove is greater than an angle $\Theta_0$ defined between a tangent line of the recess 18A at a point where the lubrication oil 18 contacts the vertical wall surface of the fine gap 6 and the vertical wall surface of the fine gap 6. This is because, where contacting the inner peripheral surface of the resin collar 24 higher in wettability than metal, an increased surface tension acts on the lubrication oil 18 than in a case other than the above. Due to the action of such an increased surface tension, the sealability was improved for the lubrication oil 18 at the opening 12A of the second fine gap 6.

Figure 9:
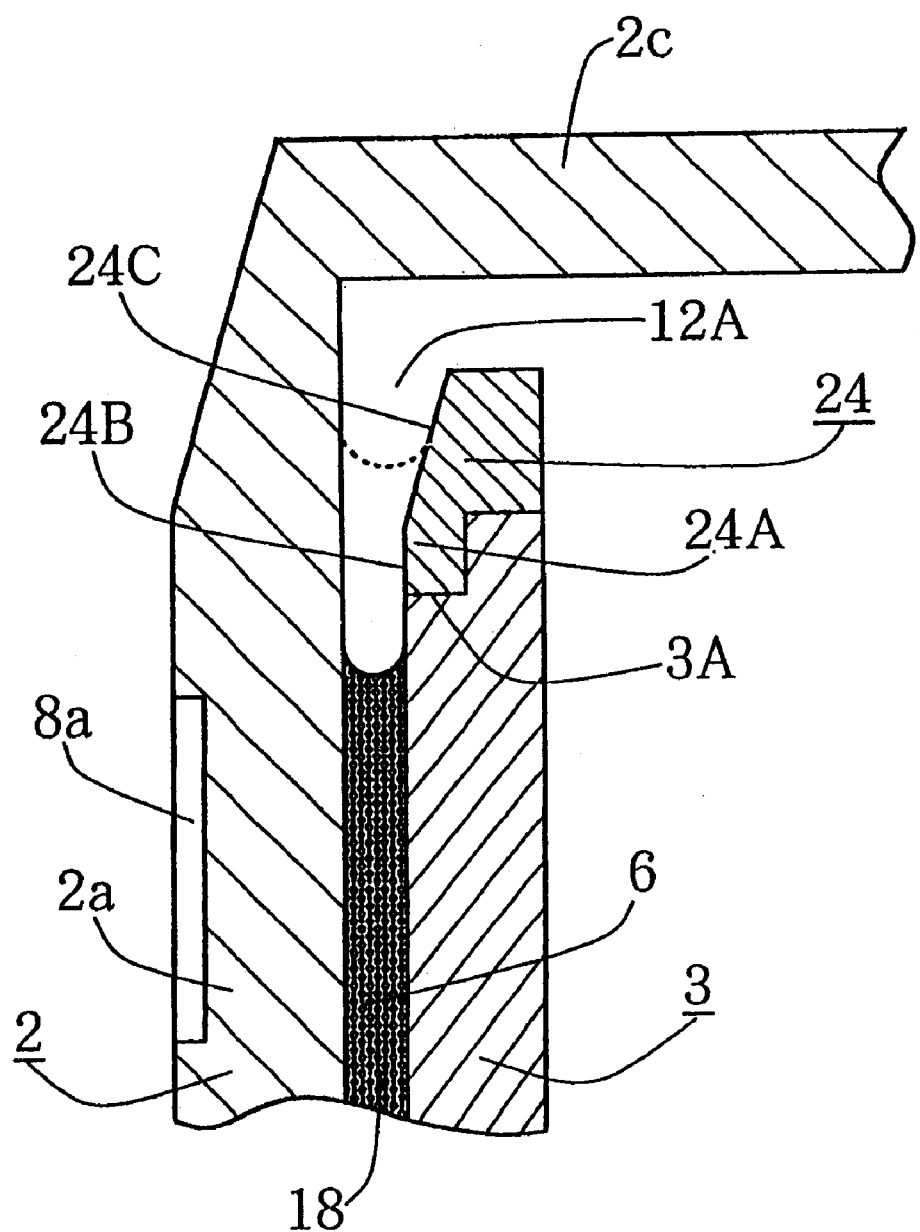
FIG. 9 is a partially magnified view including a modification to the resin-make collar.

Referring to FIG. 9, there is shown a magnified view of a modification to the resin collar 24. A resin collar 24 is the same in basic structure as that of FIG. 8 but different in its inner peripheral surface. That is, the resin collar 24 of FIG. 8 had the inner peripheral surface as a cylindrical surface having its same inner diameter as the inner peripheral surface of the fixed sleeve 3. On the contrary, the resin collar 24 of FIG. 9 has an inner peripheral surface formed by a lower vertical inner peripheral portion 24B and a upper stanted inner peripheral surface 24C. The vertical inner peripheral portion 24B has a same inner diameter as that of an inner peripheral surface of the fixed sleeve 3. The slanted inner peripheral portion 24C is a tapered surface having an inner diameter increasing continuously from a boundary to the vertical inner peripheral surface portion 24B toward an opening end that is opened to the air.

In FIG. 9, the resin collar 24 at its fitting annular leg 24A is press-fitted into the fitting annular step 3A of the fixing sleeve 3, thereby closely fitting and fixing the resin collar 24 to an end of the fixed sleeve 3.

The provision of the fluid seal of FIG. 9 using the resin collar 24 to the opening 12 of the second fine gap 6 further improved the sealability for the lubrication oil 18 in the second fine gap 6. That is, the sealability for the lubrication oil 18 in the second fine gap 6 was further improved by the seal due to an increased surface tension given by a good wettability of the resin collar 24 and the capillary seal utilizing a slant type annular seal groove formed by the slanted inner peripheral surface portion 24C and the corresponding vertical outer peripheral surface of the rotary sleeve 2.

Incidentally, the material of the resin collar 24 may be a polyimide based resin or fluorine based resin, instead of the Teflon based resin. Polyimide based resin exhibits equivalent wettability to that of fluorine based resin, and is excellent in formability.

Figure 10:
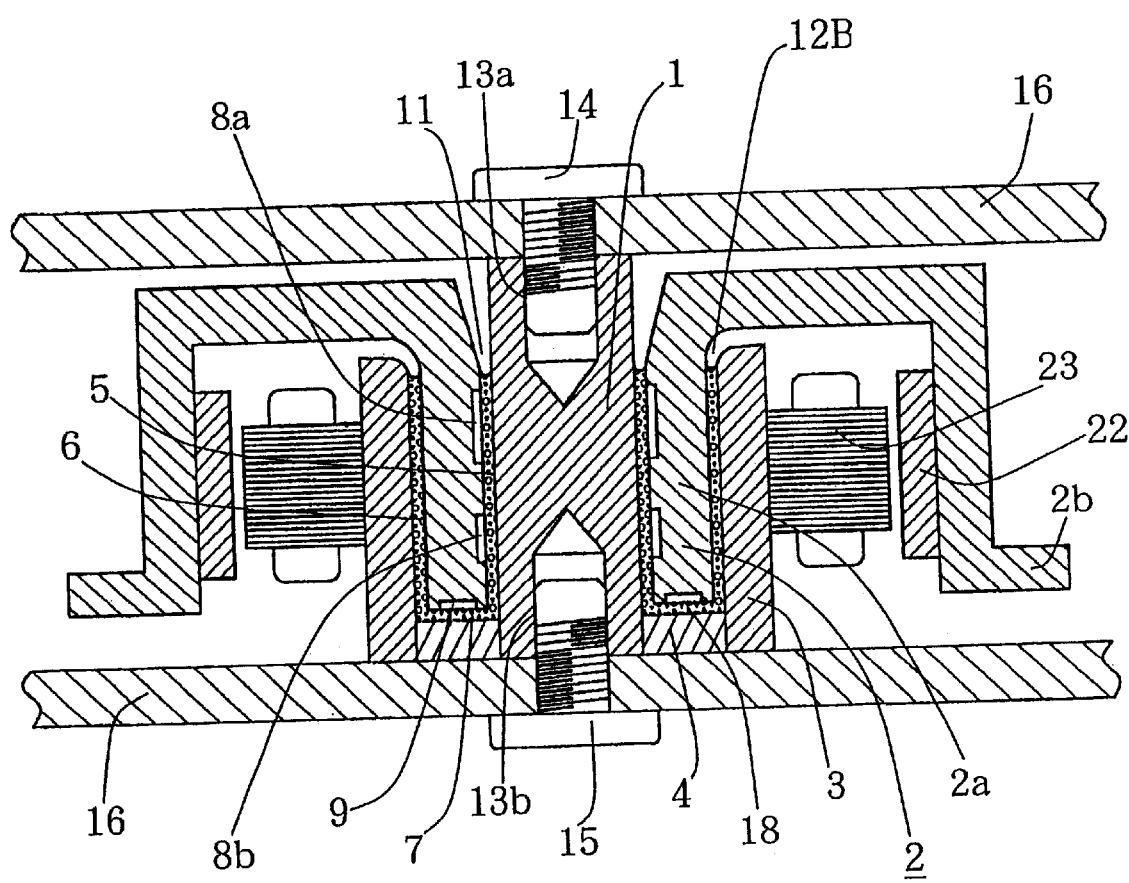
FIG. 10 is a sectional view of a spindle motor having a fourth embodiment of a fluid dynamic pressure bearing according to the present invention.

Referring to FIG. 10, a sectional view of a spindle motor is shown having a fourth embodiment of a fluid dynamic pressure bearing of the invention.

The fluid dynamic pressure bearing of FIG. 10 is the same in basic structure as the fluid dynamic pressure bearing of FIG. 1. The different point lies in a structure of an annular seal groove formed in an opening in a second fine gap 6 to have a groove width continuously extending radially outward. That is, in the fluid dynamic pressure bearing of FIG. 1, the fixed sleeve 3 at its end inner peripheral surface was made as the annular slant inner peripheral surface and further the corresponding outer peripheral surface of the rotary sleeve 2 to the end inner peripheral surface of the fixed sleeve 3 was made in the vertical outer peripheral surface, whereby the slant annular seal groove was formed having a groove width continuously extending radially outward toward the opening 12 of the second fine gap 6. On the contrary, the fluid dynamic pressure bearing of FIG. 10 adopts a curved-type annular seal groove 12B different from the above.

Figure 11:
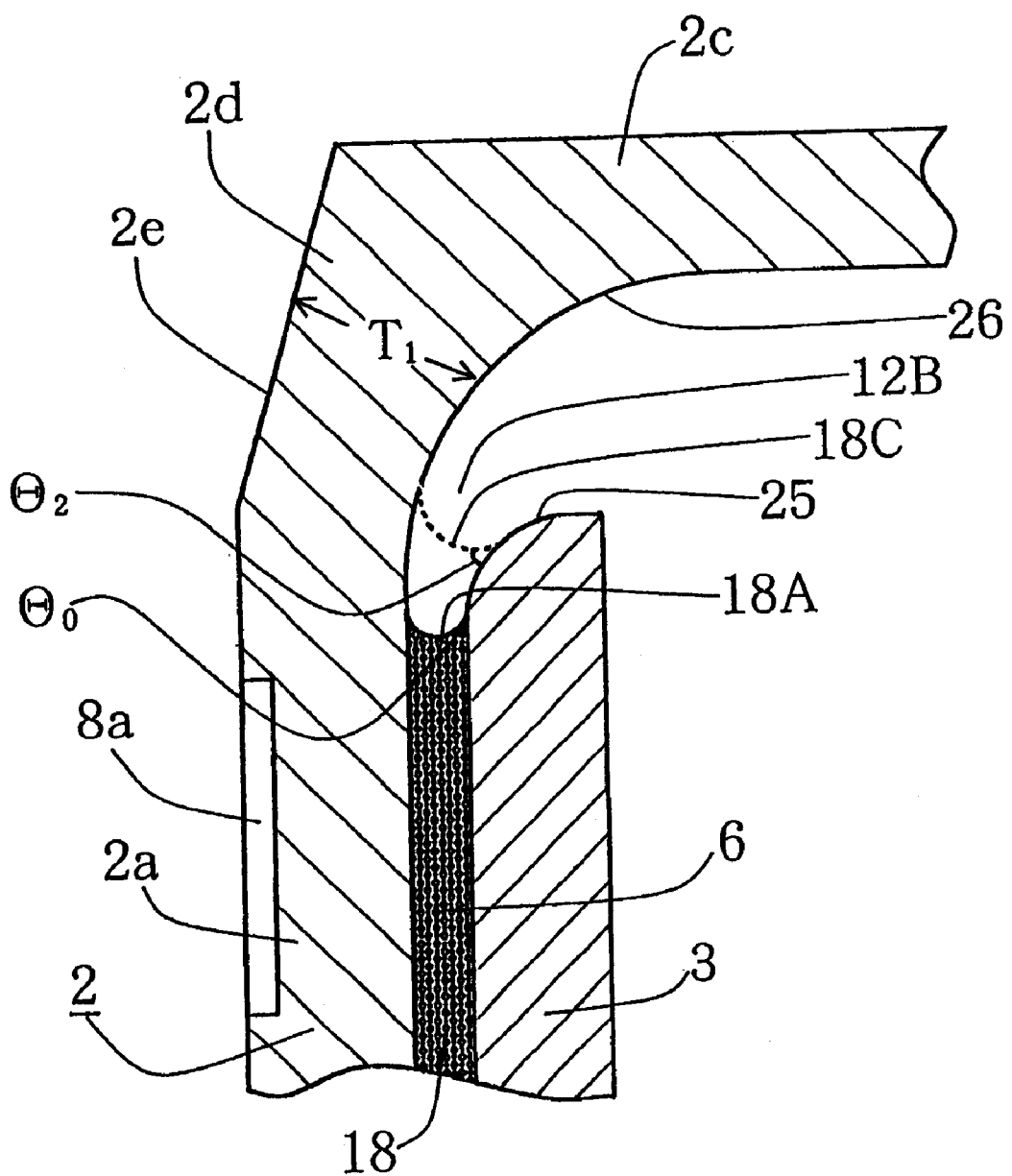
FIG. 11 is a partially magnified view including a fluid seal portion.

That is, the fluid dynamic pressure bearing of FIG. 10 has a fluid seal structure formed by a curved-type annular seal groove 12B in an opening of a second fine gap 6 and having a groove width continuously extending radially outward, and structured by a first curved wall surface 25 and second curved wall surface 26 both curved radially outward. As shown in FIG. 11 as a partly magnified view of FIG. 10, the first curved wall surface 25 is formed at an end of the fixed sleeve 3 while the second curved wall surface 26 is formed in an opposed outer peripheral surface of the rotary sleeve 2 to the first curved wall surface 25, i.e. in a wall surface connecting a vertical outer peripheral surface of the rotary sleeve 2 and an underside of a horizontal disc-formed extending portion 2c. The first curved wall surface 25 formed in the fixed sleeve 3 and the second curved wall surface 26 formed in the rotary sleeve 2 have respective radii of curvature determined such that the groove width continuously increases from a minimum groove width portion toward a maximum groove width portion of the curved type annular seal groove 12B.

The provision of the curved-type annular seal groove 12B at the opening of the second fine gap 6 improved the lubrication oil sealability at that portion. That is, the lubrication oil 18 reaching the curved-type annular seal groove 12B has an arcuate recess 18C in a surface in smaller in recessing than an arcuate recess 18A in a surface of a lubrication oil 18 reaching close to the opening 12 of the second fine gap 6 but not reaching the curved-type annular seal groove 12B. In other words, an angle $\Theta_2$ defined between a tangent line of the recess 18C at a point where the lubrication oil 18 contacts the curved wall surface of the curved-type annular seal groove 12B and the curved wall surface of the curved-type annular seal groove 12B is greater than an angle $\Theta_0$ a defined between a tangent line of the recess 18A at a point where the lubrication oil 18 contacts the vertical wall surface of the fine gap 6 and the vertical wall surface of the fine gap 6. This is because of increase in surface tension at this portion by curving the pair of wall surfaces of the curved-type annular seal groove 12B with a determined radii of curvature so that the groove width continuously increases from a minimum groove width portion to a maximum groove width portion. Due to the action of such an increased surface tension, the sealability was improved for the lubrication oil 18 at the opening 12 of the second fine gap 6.

Figure 12:
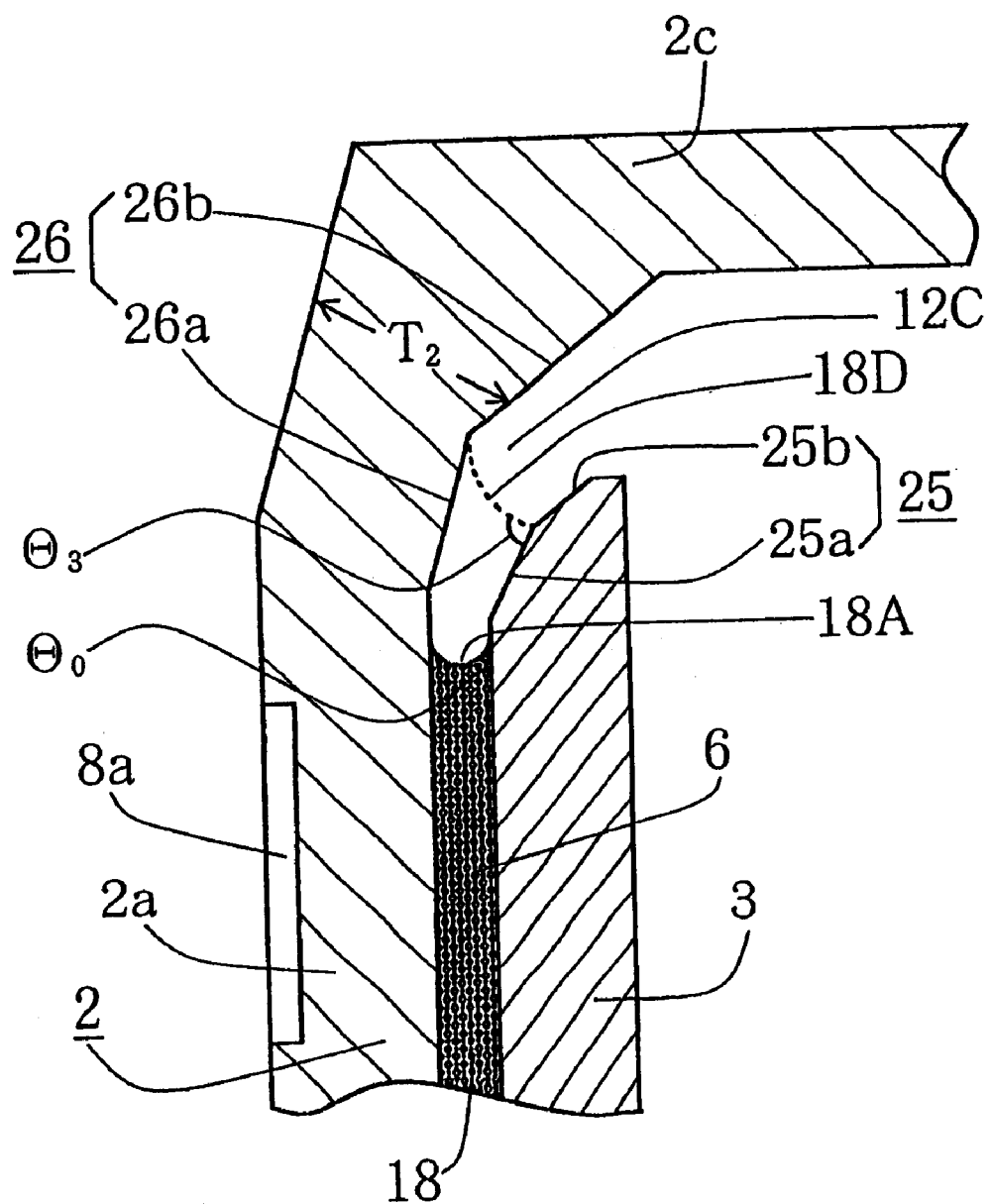
FIG. 12 is a partially magnified view including a modification to the fluid seal portion.
Figure 13:
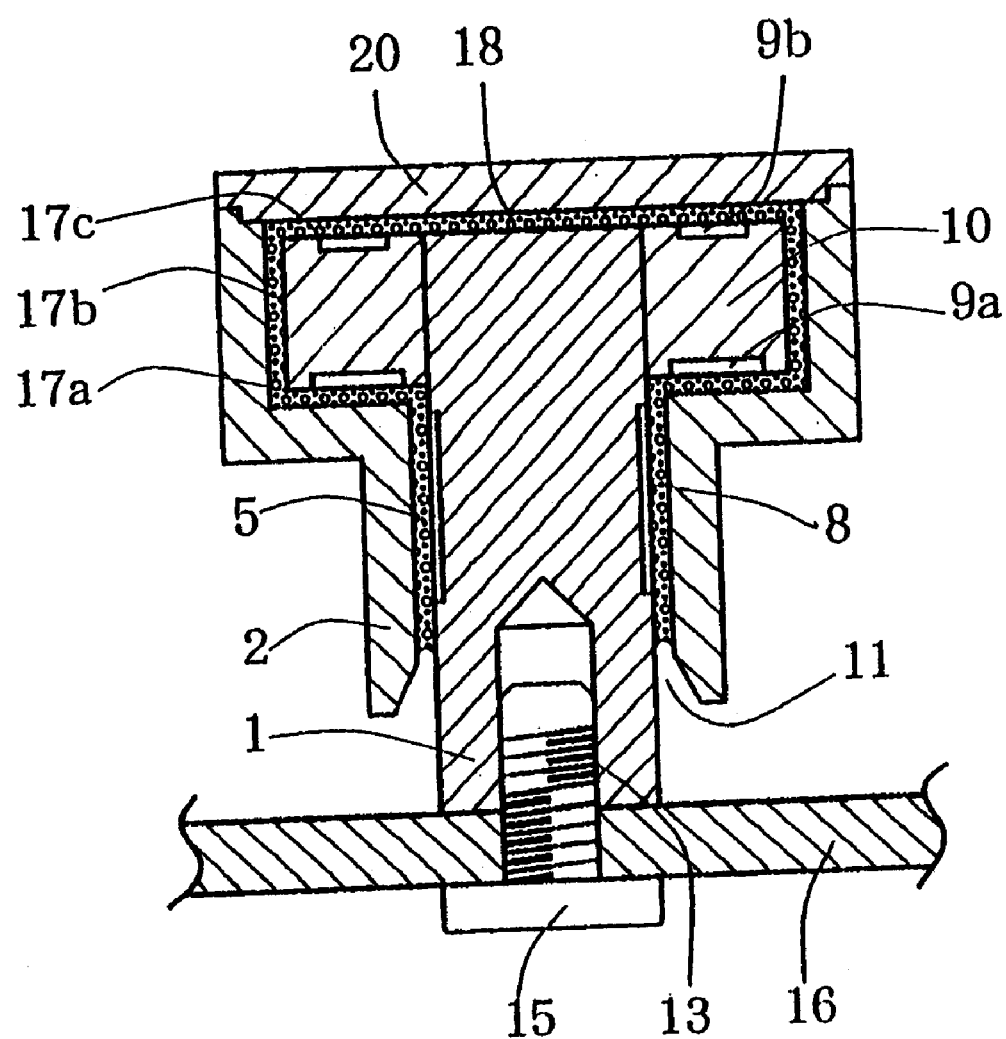
FIG. 13 is a sectional view of a one-end fixed-shaft type fluid dynamic pressure bearing of a related art.
Figure 14:
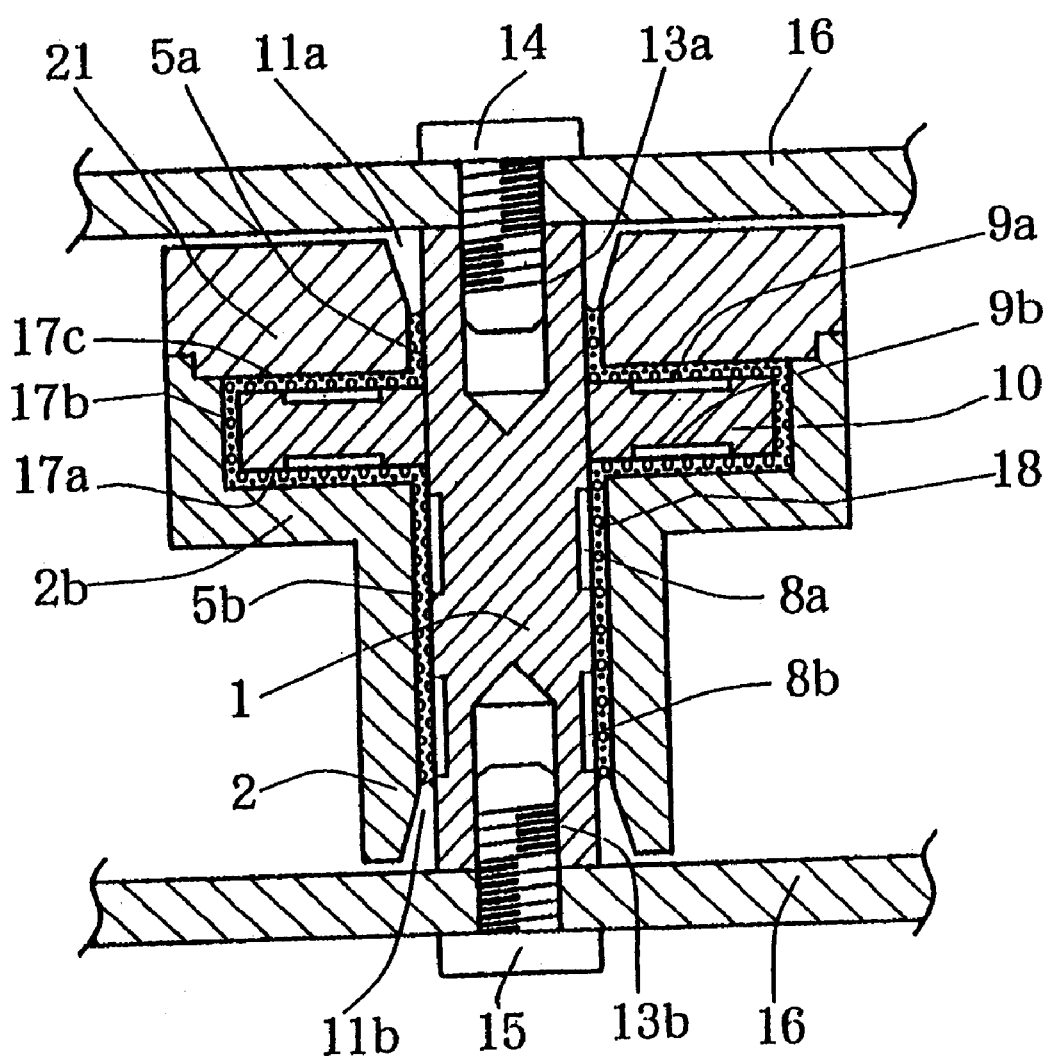
FIG. 14 is a sectional view of a both-end fixed-shaft type fluid dynamic pressure bearing of a related art.

Referring to FIG. 12, a multi-staged slant type annular seal groove 12C is shown in a partially magnifying view which is a modification for the curved-type annular seal groove 12B of FIG. 11. The multi-staged slant type annular seal groove 12C has a groove width increasing by stages from its minimum groove width portion toward maximum groove width portion, and formed by a first curved wall surface 25 having a plurality of annular slant surface 25a, 25b slanted by stages adially outward and a second curved surface 26 having a plurality of annular slant surface 26a, 26b also slanted by stages adially outward. The first curved wall surface 25 is formed in an end of a fixed sleeve 3, while the second curved wall surface 26 is formed in an opposed outer peripheral surface of a rotary sleeve 2 to the first curved surface, i.e. in a wall surface of the rotary sleeve 2 connecting a vertical outer peripheral surface and an underside of a horizontal disc-formed extending portion 2c.

The provision of the multi-staged slant type annular seal groove 12C at the opening of the second fine groove 6 improved the lubrication oil sealability at this portion. That is, the lubrication oil 18 reaching the multi-staged slant type annular seal groove 12C has a in arcuate recess 18D in surface in smaller in recessing than in arcuate recess 18A an surface of a lubrication oil 18 reaching close to the opening 12 of the second fine gap 6 but not reaching the multi-staged slant type annular seal groove 12C. In other words, an angle $\Theta_3$ defined between a tangent line of the recess 18D at a point where lubrication oil 18 contacts the annular slant wall surface of the multi-staged slant type annular seal groove 12C and the annular slant wall surface is greater than an angle $\Theta_0$ defined between a tangent line of the recess 18A at a point where the lubrication oil 18 contacts the vertical wall surface of the fine gap 6 and the vertical wall surface. This is because of increase in surface tension at this portion due to the multi-staged slant type annular seal groove 12C having a groove width increasing by stages from a minimum groove width portion to a maximum groove width portion structured by a first plurality slant wall surface having a plurality of annular slant surfaces slanted by stages radially outward and a second plurality slant wall surface having a plurality of annular slant surfaces similarly slanted by stages radially outward. Due to the action of such an increased surface tension, the sealability was improved for the lubrication oil 18 at the opening of the second fine gap 6.

The multi-staged slant type seal groove 12C functions as above and hence constitutes so-called a multi-staged capillary seal. Accordingly, the angle $\Theta_3$ defined between a tangent line of the recess 18D at a point where lubrication oil 18 contacts the annular slant wall surface of the multi-staged slant type annular seal groove 12C and the annular slant wall surface is increased at a boundary to an adjacent capillary seal stage. Thus, the surface tension is increased at this boundary.

In case that the curved-type annular seal groove 12B of FIG. 11 or multi-staged slant type annular seal groove 12C of FIG. 12 is provided in the opening of the second fine gap 6, it is possible to enhance the mechanical strength for a base portion 2d of the horizontal disc-formed extended portion 2c integrally coupling a cup-like hub portion 2b to a sleeve portion 2a of the rotary sleeve 2. For example, in the fluid dynamic pressure bearing, the rotary sleeve 2 at its upper end inner peripheral surface 2e is made as an annular slant surface, in order to provide a capillary seal in the opening 11 of the first fine gap 5, as is clear by reference to FIG. 8. Due to this, the base portion 2d is reduced in thickness T0. Contrary to this, the base portion 2d is enhanced in mechanical strength because greater than the thickness T0 is a thickness T1 of the base portion 2d where a curved type annular seal groove 12B is provided in the opening of the second fine gap 6 and also a thickness T2 of the base portion 2d where a multi-staged slant type annular seal groove 12C is provided in the opening of the second fine gap 6.

Although the present invention was explained hereinabove by way of various embodiments, the scope of the invention should never be limited to these embodiment but be defined by the inventions set forth in the claims attached herewith and those of their equivalencies.

What is claimed is:

1. A fluid dynamic pressure bearing, comprising:
 a fixed shaft having at least one of a pair of ends mountable to an apparatus;
 a rotary sleeve having an inner peripheral surface arranged adjacent to an outer peripheral surface of the fixed shaft so as to provide a first fine gap therebetween; and
 a fixed sleeve having an inner peripheral surface arranged adjacent to an outer peripheral surface of the rotary sleeve so as to provide a second fine gap therebetween;
 wherein the first fine gap and the second fine gap each have one open end exposed to air outside the bearing and one closed end in direct communication with the closed end of the other, the fine gaps are filled with lubrication oil, one of the first and second fine gaps is formed with a dynamic pressure producing groove, and the open ends of the first fine gap and the second fine gap face in the same direction and are filled with the lubrication oil to substantially the same level.

2. A fluid dynamic pressure bearing according to claim 1; wherein the first fine gap and the second fine gap are the same in height at the open ends thereof.

3. A fluid dynamic pressure bearing according to claim 1; wherein the fixed shaft is a circular columnar member, the rotary sleeve is a member surrounding the fixed shaft and having a semi-spherical portion, and the fixed sleeve is a member surrounding the rotary sleeve and having an inner peripheral surface cooperating with a semi-spherical surface of the rotary sleeve to provide said second fine gap therebetween.

4. A fluid dynamic pressure bearing according to claim 1; wherein the fixed shaft has a cylindrical shape.

5. A fluid dynamic pressure bearing according to claim 1; wherein the fixed sleeve has a cylindrical shape, the fixed shaft is disposed centrally within the fixed sleeve, and the rotary sleeve is disposed between the fixed shaft and the fixed sleeve.

6. A fluid dynamic pressure bearing according to claim 1; wherein the first and second fine gaps have the same width.

7. A fluid dynamic pressure bearing according to claim 1; wherein the rotary sleeve has a cylindrical sleeve portion extending between the fixed shaft and the fixed sleeve, a hub portion extending laterally outward from an outer peripheral surface of the cylindrical sleeve portion opposite the fixed shaft, and a disc-shaped portion connecting the cylindrical sleeve portion and the hub portion.

8. A fluid dynamic pressure bearing according to claim 7; wherein the hub portion of the rotary sleeve has a cup-shaped form; and further comprising a magnet disposed on an inner peripheral surface of the hub portion facing the fixed shaft, and a coil disposed on an outer peripheral surface of the fixed sleeve facing the magnet.

9. A fluid dynamic pressure bearing according to claim 1; wherein the fixed shaft has opposing ends each being fixedly mountable to a support member of the apparatus in which the bearing is used.

10. A fluid dynamic pressure bearing according to claim 1; further comprising a third fine gap having a first closed end meeting the closed end of the first fine gap and a second closed end meeting the closed end of the second fine gap.

11. A fluid dynamic pressure bearing according to claim 1; wherein the second fine gap has a greater width than that of the first fine gap and the width of the second fine gap is within a range capable of producing a dynamic pressure.

12. A fluid dynamic pressure bearing according to claim 11; wherein the first fine gap has a width of approximately 5 to 20 $\mu$m, and the second fine gap has a width of approximately 50 to 500 $\mu$m.

13. A fluid dynamic pressure bearing according to claim 1; wherein the fixed sleeve has a collar formed of a resin serving as a seal disposed at an end thereof.

14. A fluid dynamic pressure bearing according to claim 13; wherein the collar is formed of a fluorine-based resin.

15. A fluid dynamic pressure bearing according to claim 13; wherein the collar is formed of a polyimide-based resin.

16. A fluid dynamic pressure bearing according to claim 1; wherein the rotary sleeve has a disc-shaped extended portion horizontally extending radially outward from an outer end thereof, and an annular seal groove is formed proximate an open end of one of the first fine gap and the second fine gap and comprising a first curved wall surface curved radially outward from a center of the fixed shaft and a second curved wall surface similarly curved radially outward to have a groove width continuously increasing from a minimum groove width portion to a maximum groove width portion.

17. A fluid dynamic pressure bearing according to claim 16; wherein the first curved wall surface is formed at an end of the fixed sleeve, and the second curved wall surface is formed in a wall surface connecting a vertical outer peripheral surface and an underside of the disc-shaped extended portion of the rotary sleeve.

18. A fluid dynamic pressure bearing according to claim 1; wherein the rotary sleeve has a disc-shaped extended portion horizontally extending radially outward from an outer end thereof, and a multi-staged slant type annular seal groove is formed in an open end of the second fine gap and comprises a first slant wall surface having a plurality of annular slant surfaces slanted in stages radially outward with respect to the fixed shaft and a second slant wall surface having a plurality of annular slant surfaces similarly slanted in stages radially outward and curved radially outward so as to have a groove width increasing in stages from a minimum groove width portion to a maximum groove width portion.

19. A fluid dynamic pressure bearing according to claim 18; wherein a first slant wall surface is formed at an end of the fixed sleeve, and the second slant wall surface is formed in a wall surface connecting a vertical outer peripheral surface and an underside of the horizontally extended portion of the rotary sleeve.

20. A fluid dynamic pressure bearing according to claim 1; wherein each of the first fine gap and the second fine gap are substantially the same in height at the open ends thereof.

21. A fluid dynamic pressure bearing according to claim 1; wherein the open end of the first fine gap has a tapered opening formed between the outer peripheral surface of the fixed shaft and the inner peripheral surface of the rotary sleeve, and the open end of the second fine gap has a tapered opening formed between the outer peripheral surface of the rotary sleeve and the inner peripheral surface of the fixed sleeve.

22. A fluid dynamic pressure bearing, comprising:
a fixed shaft having at least one of a pair of ends mountable to an apparatus;
a rotary sleeve having an inner peripheral surface arranged adjacent to an outer peripheral surface of the fixed shaft so as to provide a first fine gap therebetween;
a fixed sleeve having an inner peripheral surface arranged adjacent to an outer peripheral surface of the rotary sleeve so as to provide a second fine gap therebetween; and
a holding member for holding the fixed shaft and the fixed sleeve so as to form a liquid-tight opening at one end of the fixed sleeve and cooperating with a lower end of the rotary sleeve to provide a third fine gap therebetween;
wherein the first fine gap and the second fine gap each have one open end exposed to air outside the bearing and one closed end in communication with the closed end of the other through the third fine gap, the fine gaps are filled with lubrication oil, one of the first and the second fine gaps is formed with a dynamic pressure producing groove, and the open ends of the first fine gap and the second fine gap face in the same direction and are filled with the lubrication oil to substantially the same level.

23. A fluid dynamic pressure bearing according to claim 22; wherein the fixed shaft is a circular columnar member, the rotary sleeve is a cylindrical member surrounding the fixed shaft, and the fixed sleeve is a cylindrical member surrounding the rotary sleeve.

24. A fluid dynamic pressure bearing according to claim 22; wherein the fixed shaft is a circular columnar member, the rotary sleeve is a conical frustum member surrounding the fixed shaft, and the fixed sleeve is a member surrounding the rotary sleeve and having an inner peripheral surface cooperating with a conical surface of the rotary sleeve to provide the second fine gap therebetween.

25. A fluid dynamic pressure bearing according to claim 22; wherein the fixed shaft is a circular columnar member having a central portion having a given diameter and upper and lower Portions surrounding the central portion and having a larger diameter than the central portion, the central portion having a larger length in an axial direction of the fixed shaft than the upper and lower portions, and the rotary sleeve is a member surrounding the fixed shaft and having an inner peripheral surface cooperating with an outer peripheral surface of the fixed shaft to form the first fine gap therebetween.

26. A fluid dynamic pressure bearing according to claim 22; wherein the fixed shaft is a circular columnar member having a central portion provided with a given diameter at an intermediate position of the fixed shaft and upper and lower portions surrounding the central portion and having a larger diameter than the central portion, the central portion having a smaller length in an axial direction of the fixed shaft than the upper and lower portions, and the rotary sleeve is a member surrounding the fixed shaft and having an inner peripheral surface cooperating with an outer peripheral surface of the fixed shaft to form the first fine gap.

27. A fluid dynamic pressure bearing according to claim 22; wherein the second fine gap has a greater width than that of the first fine gap and the width of the second fine gap is within a range capable of producing a dynamic pressure.

28. A fluid dynamic pressure bearing according to claim 27; wherein the first fine gap has a width of approximately 5 to 20 µm, and the second fine gap has a width of approximately 50 to 500 µm.

29. A fluid dynamic pressure bearing according to claim 22; wherein the fixed sleeve has a collar formed of a resin serving as a seal disposed at an end thereof.

30. A fluid dynamic pressure bearing according to claim 29; wherein the collar is formed of a fluorine-based resin.

31. A fluid dynamic pressure bearing according to claim 29; wherein the collar is formed of a polyimide-based resin.

32. A fluid dynamic pressure bearing according to claim 22; wherein the rotary sleeve has a disc-shaped extended portion horizontally extending radially outward from an outer end thereof, and an annular seal groove is formed proximate an open end of one of the first fine gap and the second fine gap and comprising a first curved wall surface curved radially outward from a center of the fixed shaft and a second curved wall surface similarly curved radially outward to have a groove width continuously increasing from a minimum groove width portion to a maximum groove width portion.

33. A fluid dynamic pressure bearing according to claim 32; wherein the first curved wall surface is formed at an end of the fixed sleeve, and the second curved wall surface is formed in a wall surface connecting a vertical outer peripheral surface and an underside of the disc-shaped extended portion of the rotary sleeve.

34. A fluid dynamic pressure bearing according to claim 22; wherein the rotary sleeve has a disc-shaped extended portion horizontally extending radially outward from an outer end thereof, and a multi-staged slant type annular seal groove is formed in an open end of the second fine gap and comprises a first slant wall surface having a plurality of annular slant surfaces slanted in stages radially outward with respect to the fixed shaft and a second slant wall surface having a plurality of annular slant surfaces similarly slanted in stages radially outward and curved radially outward so as to have a groove width increasing in stages from a minimum groove width portion to a maximum groove width portion.

35. A fluid dynamic pressure bearing according to claim 34; wherein a first slant wall surface is formed at an end of the fixed sleeve, and the second slant wall surface is formed in a wall surface connecting a vertical outer peripheral surface and an underside of the horizontally extended portion of the rotary sleeve.

36. A fluid dynamic pressure bearing according to claim 22; wherein each of the first fine gap and the second fine gap are substantially the same in height at the open ends thereof.

37. A fluid dynamic pressure bearing according to claim 22; wherein the open end of the first fine gap has a tapered opening formed between the outer peripheral surface of the fixed shaft and the inner peripheral surface of the rotary sleeve, and the open end of the second fine gap has a tapered opening formed between the outer peripheral surface of the rotary sleeve and the inner peripheral surface of the fixed sleeve.

38. In a spindle motor comprising a rotor including a rotor magnet, a stator including a stator coil and a bearing for rotatably supporting the rotor with respect to the stator so that a current in the coil causes the rotor to undergo rotation; wherein the bearing comprises the fluid dynamic pressure bearing according to either claim 1 or claim 22.

39. A rotary apparatus having a rotationally driven member and a drive source for driving the driven member; wherein the drive source comprises the spindle motor according to claim 38.

40. A bearing comprising: a fixed shaft having at least one end fixedly mountable to an apparatus; a rotary sleeve arranged coaxially with the fixed shaft so that a first fine gap is formed between an inner peripheral surface of the rotary sleeve and an outer peripheral surface of the fixed shaft; a fixed sleeve arranged coaxially with the rotary sleeve so that a second fine gap is formed between an inner peripheral surface of the fixed sleeve and an outer peripheral surface of the rotary sleeve; and a lubrication oil filled in the fine gaps; wherein the first fine gap and the second fine gap each have an open end exposed to air outside the bearing, each of the open ends facing in the same direction, and an opposite end that is not exposed to the air, each of the opposite ends of the first and second fine gaps meet each other, and the first and second fine gaps being filled with the lubrication oil to substantially the same level.

41. A bearing according to claim 40; further comprising a holding member for holding the fixed shaft and the fixed sleeve disposed adjacent to a lower end surface of the rotary sleeve to provide a third fine gap between the holding member and the lower end surface of the rotary sleeve.

42. A bearing according to claim 41; wherein the opposite ends of the first and second fine gaps meet each other through the third fine gap.

43. A bearing according to claim 41; wherein the third fine gap is formed with a thrust dynamic pressure producing groove.

44. A bearing according to claim 40; wherein a peripheral surface of at least one of the fixed shaft, the rotary sleeve and the fixed sleeve forming at least one of the first and second fine gaps has a dynamic pressure producing groove formed therein.

45. A fluid dynamic pressure bearing according to claim 40; wherein the open end of the first fine gap has a tapered opening formed between the outer peripheral surface of the fixed shaft and the inner peripheral surface of the rotary sleeve, and the open end of the second fine gap has a tapered opening formed between the outer peripheral surface of the rotary sleeve and the inner peripheral surface of the fixed sleeve.

46. A bearing according to claim 40; wherein each of the first fine gap and the second fine gap are substantially the same in height at the open ends thereof.

* * * * *